United States Patent Office 3,450,549
Patented June 17, 1969

3,450,549
STARCH ADHESIVE AND PROCESS FOR ITS PREPARATION
Hellmuth C. Schwalbe, Savannah, Ga., assignor to The Mead Corporation, Dayton, Ohio, a corporation of Ohio
No Drawing. Continuation-in-part of application Ser. No. 258,154, Feb. 13, 1963. This application Apr. 25, 1966, Ser. No. 544,719
Int. Cl. C09j 3/06; C09d 3/20; C08b 25/02
U.S. Cl. 106—210                    6 Claims

ABSTRACT OF THE DISCLOSURE

The present invention relates to the production of substantially color-free starch suitable for use as an adhesive in high solids pigmented coating compositions for application to paper by machine coating methods. In carrying out the process, aqueous starch pastes are subjected to partial hydrolysis using small amounts of an amylolytic enzyme. After reducing the viscosity of the starch in this manner to a viscosity of the order of not substantially less than 200 centipoises (measured at 140° F. and 31% solids), the enzyme is inactivated by heating and the resulting starch subjected to further viscosity reduction by introducing a stream of said starch into jets of high velocity steam.

---

This application is a continuation-in-part of United States application Ser. No. 258,154, filed Feb. 13, 1963, now abandoned.

The present invention relates to improvements in the art of adhesives and to adhesives so produced. More particularly, it relates to adhesives produced from starch which are suitable for use in high solids pigmented compositions for application to paper by known machine coating methods.

Adhesives have been produced from starch for use in paper coating for many years and have been extensively employed in various forms and in a variety of coating methods. Such adhesives, however, have not been uniformly satisfactory for various reasons. Generally, the native starches, after pasting, are too viscous to permit the formulation of satisfactory high solids coating compositions which can be readily handled and applied. Attempts have been made to overcome this difficulty by reducing the viscosity of the native starches by degradation of the starch molecule by such methods as hydrolysis, oxidation, chlorination, or by the preparation of various starch derivatives such as various starch ethers. Such procedures, however, have not been generally satisfactory for various reasons, both because of procedural difficulties and because of deleterious effects upon the adhesive properties of the starch.

One of the most effective methods previously employed for the reduction of the viscosity of native starches to be used in making adhesives has consisted of reducing the molecular weight of the starch by hydrolysis and, preferably, by enzyme hydrolysis. This operation also has not been completely satisfactory because of the fact that the hydrolysis employed reduced the adhesiveness of the starch to such an extent that it was not particularly suitable for use in high solids coating compositions.

Attempts have also been made in the past to produce starch adhesives of suitable viscosity by subjecting the extremely long high viscosity starch molecule to a mechanical shearing action to break the long molecules into shorter segments without destroying the adhesiveness of the native starch molecule. This procedure, however, has likewise not given satisfactory results for various reasons and generally is applicable only to the preparation of starch adhesives used in making low solids coating compositions.

It is an object of the present invention to provide a practical, economical method for the production of starch adhesives of improved bonding strength suitable for use in high solids coating compositions for coating paper.

It is a further object of the present invention to produce starch adhesives of high bonding strength suitable for use in high solids paper coating compositions by subjecting native starches to regulated enzymatic hydrolysis followed by regulated mechanical shearing of the resulting partially enzymatically hydrolyzed starch molecules.

Other objects will become apparent from the description which follows, taken in combination with the appended claims.

According to the present invention, the above objects are attained and, at the same time, most of the difficulties of the prior art are overcome by producing the desired starch adhesives in the following manner. The native starch to be used is first subjected to a regulated degree of hydrolysis by the action of alpha-amylase. This is accomplished by preparing an aqueous paste of the starch in the manner and of the concentrations customarily used for enzymatic hydrolysis. This aqueous suspension of starch is then inoculated with approximately one-half the amount of alpha-amylase (0.009–0.0107% by weight based on the weight of the starch) normally used for the hydrolysis of starch. After thoroughly incorporating the added alpha-amylase with the starch suspension, the latter is maintained at a temperature of approximately 170° F. until the viscosity of the starch is reduced to not substantially below 200 and preferably in the range of 210–520 centipoises when measured at 31% solids at 140° F. Further reduction of the starch viscosity is then stopped by inactivating the alpha-amylase by heating to approximately 220° F., or by other suitable means.

The partially hydrolyzed starch obtained as above described is then subjected to a mechanical shearing treatment to effect further reduction in the viscosity of the starch at which point the shearing operation is stopped and the resulting product is found to possess strong adhesive properties and at the same time is free from the undesirable "set-back" or retrograding effect which is frequently shown by starch adhesives prepared by prior methods. While the exact mechanism of the shearing treatment is not definitely known, it is believed that it serves to disentangle the starch aggregates resulting from the initial enzymatic hydrolysis action.

In the above described sequence of operations, several factors are of considerable importance and it is particularly important that the initial enzymatic hydrolysis operation be carried out in a manner so as to produce substantially no amount of dextrinized starch products, the presence of which materially reduces the bonding action of the starch adhesive. The production of such minimum amounts of dextrinized starch products is effected by using as the hydrolyzing agents, reduced amounts of alpha-amylase (no more than approximately one-half the amount normally used for hydrolyzing starch), and by stopping the hydrolysis action before the viscosity of the starch falls below approximately 200 centipoises. When the viscosity is reduced substantially below this value, the amount of dextrinized starch products formed materially reduces the bonding properties of the starch adhesive. While satisfactory adhesives can be obtained when the viscosity is not reduced below 540 centipoises, the production of an adhesive of satisfactory viscosity and bonding properties for high solids coating compositions usually requires the shearing operation to be continued to such an extent as to unduly increase the cost of the final adhesive. In order to obtain an adhesive of optimum properties, it is also important that the sequence of operations be carried out as specified above. Carrying out the operation as above described has been found to give starch adhesives highly uniform in character and having bonding properties significantly higher than has been found possible by any of the prior art methods.

The shearing of the partially hydrolyzed starch can be suitably effected by any of the conventional methods for effecting shearing, as, for example, by agitating the partially hydrolyzed starch at high speeds until the desired reduction in viscosity is attained. A convenient and economical method of effecting this high speed agitation is by means of jets of high speed steam directed so as to rupture the starch aggregates. The stearing operation is desirably carried out at elevated temperatures of the range of 260–300° F. Other conventional methods of shearing can also be used.

While most of the prior art methods for the production of starch adhesives have been limited to the use of corn starch, it has been found that the process of the present invention permits the preparation of good starch adhesives from such starches as, for example, potato starch. In the case of potato starch, ordinary enzymatic conversion results in a product which imparts a grainy character to paper coated therewith and this in turn detracts from the quality of printed matter applied to such surfaces. When prepared by the process of the present invention, however, potato starch adhesives have been found to give higher bond strengths than that obtained with corn starch adhesives prepared by the enzymatic hydrolysis method.

As previously noted, the starch adhesives of the present invention are particularly adapted to use in high solids coating compositions for direct application to paper. By the term "high solids" is meant solids concentrations above 50% and, more specifically, within the range of 60 to 70%. To achieve proper pigment dispersion and proper blending of the pigment compositions with the adhesive component, the solids concentration of the adhesive fraction must be of the order of 25 to 30% solids to ensure sufficient water for the proper dispersion of the pigment fraction. For example, a finished coating composition at 60% solids involves 67 parts of water for each 100 parts of solids contained therein. If this composition contains 10% (dry basis) adhesive which is added to the composition as a 26% solution or dispersion, it carries with it 30 parts of water which leaves only 37 parts of water for dispersing the pigment. Thus, the 90 parts of dry basis pigment must be prepared at a solids concentration of 70.8% in order for the final composition to have a solids concentration of 60%. This concentration of almost 71% for preparing pigment dispersions is about the upper limit that can be used in order to obtain thorough dispersion of the pigment particles and emphasizes again the need for the highest possible solids concentration in the adhesive portion of the composition, and which obviously cannot be obtained without suitable reduction in the viscosity of the adhesive. As has previously been noted, the prior art methods for obtaining this reduced viscosity of the starch adhesive have resulted in a corresponding undesirable reduction in the bonding power of the adhesive and resulting coating composition.

In the examples which follow, the controls used are largely based on viscosity measurements. Since viscosity is a function not only of molecular weight or size of molecule but also of temperature, concentration and rate of shear at which the viscosity determination is made, it is necessary to standardize carefully the conditions of the viscosity measurements so that the values are truly comparable. The determination of viscosity at a low rate of shear will provide information useful in designing agitators for storage tanks and for pumping where normally such relatively low rates of shear are encountered. However, the extremely high shear conditions prevailing in the nip of coating rolls in high speed machine coating procedures require a measurement to be made at a rate of shear of the same order of magnitude, which is frequently as high as 7,000 seconds-1 up to 10,000 seconds-1.

Measurements made at the solids content and temperature prevailing in the various process steps must also be referred to a standard temperature and concentration to provide comparable data. Over a prolonged period of time and based on thousands of tests, it is now possible to compare viscosity measurements at one temperature to that which would prevail at some different temperature and also to correct viscosity measurements at one solids content to another standard solids content. Thus, a viscosity of 105 centipoises measured at 166° F. and 23.3% solids is equivalent to 540 centipoises at 140° F. and 31% solids. These corrections to a standard temperature of 140° F. and a solids content of 31% have been made prior to the reporting of the data in the various examples below.

The specific examples given below are intended to illustrate further the invention disclosed above. Variations from the specific procedures set forth in these examples will be obvious to one skilled in the art. It is understood, therefore, that any such variations which do not depart from the basic invention disclosed herein are intended to fall within the scope of the appended claims.

EXAMPLE 1

A slurry of corn starch was prepared by adding 2,500 pounds dry weight of commercial corn starch to 860 gallons of water in a wetting out tank. The starch was slurried in this tank for a period of approximately 30 minutes during which time the grains underwent an initial swelling action. To this slurry was then added 0.227 pound (0.009% based on dry starch) of Vanzyme #31, a commercial enzyme supplied by the R. T. Vanderbilt Co. Vanzyme #31 is an alpha-amylase of the bacillus subtilis type which is characterized by its action in attacking starch molecules near the middle of the starch polymer chain rather than by hydrolyzing end groups. This amount of enzyme is much lower than is generally considered feasible in the usual enzyme hydrolysis of starch wherein the enzyme treatment is the only viscosity reducing treatment. A more normal level of enzyme addition would be of the order of 0.02%.

The starch slurry with the enzyme added was then pumped to a conversion chamber equipped with an efficient agitator which provided a thorough blending of the starch throughout the vessel. To effect the hydrolytic action of the enzyme, the starch slurry was heated by direct steam to a temperature of 170° F. and held at this temperature for 40 to 60 minutes or until the desired end viscosity has been reached. This was measured continuously by means of a Griesheimer Viscosimeter (U.S. Patent No. 2,392,662) at a shear rate of 7,000 seconds-1. When a viscosity of 540 centipoises (at 140° F. and 31% solids) was reached, the enzyme was inactivated by the introduction of direct steam to the chamber with heating of the starch slurry to 220° F. which temperature was sufficient to inactivate any enzyme remaining in the mixture. After inactivation, the Griesheimer viscosity was 520 centipoises at 31% solids and 140° F.

The product from the above enzymatic treatment containing the inactivated alpha-amylase and starch at a viscosity of 520 centipoises at 31% solids and 140° F. was next subjected to mechanical shearing by introducing said starch suspension at the rate of 10 gallons per hour into a stream of high velocity steam at 140 pounds per square inch gauge which rapidly raised the temperature of the starch to 268° F. while subjecting the latter to violent turbulence which served to shear the starch and further reduce its viscosity to 455 centipoises at 31% solids and 140° F. This operation can be carried out in various forms of apparatus. One suitable form is the Thermal Cooker manufactured by the Thermal Cooker Corporation and described in U.S. Patent No. 2,678,276, provided the starch and steam are introduced therein in a manner so as to create high turbulence in the introduced starch stream and not merely heating.

At the conclusion of the shearing operation, the resulting starch was transferred to a storage tank wherein it was cooled to a temperature of approximately 190° F. and from this tank was transferred as required for preparing high solids paper coating compositions. The product was found to be uniform in quality, of high bonding quality and not subject to "set-back." When mixed with clay pigment in a high solids coating composition (of the order of 66% solids) and applied to the surface of a paper web, it was found that the bond strength of the paper was 8 Dennison wax units and that the brightness of the paper had not been adversely affected by the high temperature and high shear treatment of the starch. By comparison, similar coated paper using starch paste adhesives of the prior art had a bond strength of 6 Dennison wax units. And from this it is evident that the starch paste of this invention had an increased bonding strength of at least 33⅓ percent. Likewise, the paper of this invention exhibited excellent printability and uniformity and was a noticeable improvement over coated paper prepared with starch products derived by prior methods.

EXAMPLE 2

To a tank provided with an agitator were introduced 963 gallons of water and 4,000 pounds (as received, equivalent to 3,520 pounds dry basis) corn starch to provide a slurry with an initial concentration of 30% solids. To this slurry were added 0.375 pound of Vanzyme #31 (0.0107%). The slurry containing the enzyme was then pumped into a cooking vessel as described in Example 1 and heated at 170° F. until a check off viscosity of 310 centipoises was reached as measured on the Greisheimer Viscosimeter, corrected to 31% solids and 140° F. Next, the enzyme was inactivated by heating with direct steam to a temperature of 220° F. at which time the Greisheimer viscosity was 280 centipoises at 31% solids and 140° F.

The starch paste from the first step was next subjected to shearing treatment by passage through a Hydro-Heater, a steam injector build by the Sirod Corporation of Milwaukee, Wis. and described in U.S. Patent 1,987,883. The starch paste wass pumped into the unit simultaneously with the injection of steam at 140 pounds per square inch gauge so as to produce high turbulence in the starch stream. The temperature in the reaction chamber reached 290° F. The starch paste delivered from the Hydro-Heater had a viscosity of 210 centipoises at 31% solids and 140° F. When incorporated in a coating composition and applied to paper by methods known in the art, coated paper was produced with a Dennison wax test of 13 to 14 as compared to prior art products which showed a wax test of 9 to 10. Brightness was not impaired by the treatment in the Hydro-Heater and the printing quality of the paper was excellent.

The Hydro-Heater used in this example is a device which was originally desired for the heating of water supplies by direct introduction of steam thereto. The design of the apparatus permits the injection of a very high velocity jet of steam into the stream of starch paste flowing through the device, and as a consequence generates an extremelly high shearing action in the starch paste.

EXAMPLE 3

Fifty-five pounds of potato starch (equivalent to 50 pounds on a dry basis) were slurried in 12½ gallons of water. To this was added 2.1 grams of Vanzyme #31 (.00925%) and after 20 minutes mixing, the slurry was heated to 170° F. and the enzyme allowed to hydrolyze the starch for 37 minutes, whereupon the mix was heated to inactivate the enzyme. The product after this step had a Greisheimer viscosity of 340 centipoises at 31% solids and 140° F.

The starch paste was then subjected to shearing by passing through a Hydro-Heater with an inlet pressure of 91 pounds per square inch gauge and 50 pounds per square inch gauge back pressure. The temperature reached through the machine was 298° F. The product delivered from the Hydro-Heater had a Greisheimer viscosity of 132 centipoises at 31% solids and 140° F. This product was then incorporated into a high solids pigmented paper coating composition of the kind well known in the art, and applied to a web of paper on a high speed paper machine. The applied coating did not exhibit the grainy character normally associated with potato starch, the pigment bonding was excellent and the coated paper had excellent printability, brightness and opacity.

As may be seen from the foregoing examples, the amount of enzyme used in the first step of the present two step process is substantially less than that normally used for starch conversion for paper coating purposes. This reduced amount of enzyme is just sufficient to open up the starch molecules and make them more responsive to the shearing action provided in the second step. In other words, the starch paste is only partially reacted so that the subsequent shearing action can be more uniformly applied. It has the further purpose of reducing the viscosity of the starch paste to a point whereby power requirements for the shearing step are greatly reduced, and thus by this invention, operations can be carried out at significantly higher solids than is the case in the absence of such a prior enzyme treatment.

Likewise, the procedure of this invention is adaptable to starches from a number of sources. Although the examples have dealt with corn starch and potato starch, the teachings of this invention apply equally well to starch from other botanical sources such as wheat starch, rice starch and the like.

While the examples have shown the use of a high velocity jet of steam to provide the high shearing condition characteristic of the second step of the present process, other methods for obtaining this are equally within the scope of the present invention. The high velocity steam jet equipment has the advantage of simplicity and freedom from moving parts. The equipment is easy to operate and relatively fool proof. However, other mechanical devices such as a high capacity heat exchanger with high shear scraping or mechanical working of the starch paste will serve equally as well in the practice of this invention.

What is claimed:

1. A process for producing an adhesive adapted for use in high solids paper coating compositions comprising the steps of subjecting a raw starch paste to the action of 0.009% to 0.015% (based on the weight of the starch) of an alpha-amylase enzyme at hydrolysis temperature until the viscosity of the said starch is reduced to a viscosity of not substantially below 200 centipoises (measured at 31% solids at 140° F.), heating said viscosity-reduced starch paste to a temperature sufficient to inactivate said amylase enzyme and thereby prevent substantial further reduction in viscosity of said starch by said amaylase enzyme, and subjecting said starch paste of reduced viscosity to a high shearing action, by passing a stream of said starch paste into high velocity steam jets until the viscosity of said starch is of the order of 130–455 centipoises (at 140° F. and 31% solids).

2. The process of claim 1 wherein said alpha-amylase is inactivated by heating to a temperature of not substantially below 210° F. and not sufficiently high to substantially damage said starch, said heating being continued for a sufficient period of time to inactivate said alpha-amylase.

3. The process of claim 1 wherein the hydrolysis of the starch is effected by the amylase at a temperature of the order of 170° F.

4. The process of claim 1 wherein said shearing action is effected at temperatures of the order of 260–300° F.

5. The process of claim 1 wherein the enzyme hydrolysis is continued until the starch has a viscosity of the order of 210–520 centipoises (at 140° F. and 31% solids).

6. In a process for the production of substantially color-free starch suitable for use as an adhesive in high solids pigmented coating compositions for application to paper by machine coating methods, the step which comprises introducing into high velocity steam jets a stream of starch paste produced by the partial hydrolysis of starch with an amylolytic enzyme and having a viscosity of 250–520 centipoises (at 140° F. and 31% solids) and maintaining said starch paste in said high velocity steam jet at a temperature of 260–300° F. until said starch is reduced in viscosity to 130–455 centipoises (at 140° F. and 31% solids), and then cooling said starch paste to prevent further reduction in viscosity.

References Cited

UNITED STATES PATENTS

| | | | |
|---|---|---|---|
| 3,029,192 | 4/1962 | Krebs | 106—210 |
| 3,083,112 | 3/1963 | Evans et al. | 106—213 |
| 3,149,049 | 9/1964 | Walkup et al. | 106—210 |
| 3,308,037 | 3/1967 | Goos et al. | 106—210 XR |
| 3,219,483 | 11/1965 | Goos et al. | 127—28 |

JULIUS FROME, *Primary Examiner.*

T. MORRIS, *Assistant Examiner.*

U.S. Cl. X.R.

106—213; 127—32, 71